US012283420B2

(12) United States Patent
Suzuki et al.

(10) Patent No.: US 12,283,420 B2
(45) Date of Patent: Apr. 22, 2025

(54) PERMANENT ELECTROMAGNETIC HOLDER AND CONVEYANCE DEVICE

(71) Applicant: SIMOTEC CO., LTD., Higashiosaka (JP)

(72) Inventors: Yasuhiro Suzuki, Osaka (JP); Kunio Ohhata, Osaka (JP)

(73) Assignee: SIMOTEC CO., LTD., Higashiosaka (JP)

( * ) Notice: Subject to any disclaimer, the term of this patent is extended or adjusted under 35 U.S.C. 154(b) by 288 days.

(21) Appl. No.: 17/917,402

(22) PCT Filed: Apr. 6, 2021

(86) PCT No.: PCT/JP2021/014575
§ 371 (c)(1),
(2) Date: Oct. 6, 2022

(87) PCT Pub. No.: WO2021/206074
PCT Pub. Date: Oct. 14, 2021

(65) Prior Publication Data

US 2023/0154661 A1 May 18, 2023

(30) Foreign Application Priority Data

Apr. 10, 2020 (JP) ................................ 2020-071194

(51) Int. Cl.
*H01F 7/20* (2006.01)
*H01F 7/02* (2006.01)
(Continued)

(52) U.S. Cl.
CPC ............ *H01F 7/20* (2013.01); *H01F 7/0231* (2013.01); *H01F 7/064* (2013.01); *B66C 1/06* (2013.01)

(58) Field of Classification Search
CPC .......... H01F 7/20; H01F 7/0231; H01F 7/064; H01F 2007/208; H01F 7/0247; H01F 7/0257; H01F 7/206; B66C 1/06
(Continued)

(56) References Cited

U.S. PATENT DOCUMENTS 6,667,677 B2 * 12/2003 Yajima .................... H01F 7/081 335/229
2002/0008601 A1 * 1/2002 Yajima .................... H01F 7/081 335/220

FOREIGN PATENT DOCUMENTS

JP S57149130 A 9/1982
JP S60130106 A 7/1985
(Continued)

OTHER PUBLICATIONS

International Search Report for International Application No. PCT/JP2021/014575; Date of Mailing, Jul. 6, 2021.
(Continued)

*Primary Examiner* — Shawki S Ismail
*Assistant Examiner* — Lisa N Homza
(74) *Attorney, Agent, or Firm* — CANTOR COLBURN LLP

(57) ABSTRACT

A permanent electromagnetic holder is provided with: a first magnet; a second magnet; and a coil, the first magnet being configured such that magnetic pole surfaces of different magnetic poles are oriented in a thrust direction of an axial center orthogonal to the attracting surface, the second magnet being configured such that magnetic pole surfaces of different magnetic poles are oriented in the thrust direction of the axial center and being disposed outside the first magnet, the coil being disposed between the first magnet and the second magnet, the first magnet, the second magnet, and the coil being arranged so as to overlap in the radial direction of the axial center, and an operation of switching an attrac-
(Continued)

tion ON/OFF state being carried out by switching a magnetizing direction of the first magnet through instantaneous energization of the coil when the attraction ON/OFF state is switched.

6 Claims, 7 Drawing Sheets

(51) Int. Cl.
*H01F 7/06* (2006.01)
*B66C 1/06* (2006.01)

(58) Field of Classification Search
USPC .......................................................... 335/290
See application file for complete search history.

(56) References Cited

FOREIGN PATENT DOCUMENTS

| | | | |
|---|---|---|---|
| JP | S61109653 | U | 7/1986 |
| JP | 2005305565 | A | 11/2005 |
| JP | 2017075020 | A | 4/2017 |
| JP | 2019102682 | A | 6/2019 |

OTHER PUBLICATIONS

PCT International Preliminary Report on Patentability for International Application No. PCT/JP2021/014575; Date of Mailing, Mar. 31, 2022.

* cited by examiner

PERMANENT ELECTROMAGNETIC HOLDER AND CONVEYANCE DEVICE

CROSS REFERENCE TO RELATED APPLICATIONS

This is the U.S. national stage of application No. PCT/JP2021/014575, filed on Apr. 6, 2021. Priority under 35 U.S.C. § 119 (a) and 35 U.S.C. § 365 (b) is claimed from Japanese Application No. 2020-071194, filed Apr. 10, 2020, the disclosure of which is also incorporated herein by reference.

TECHNICAL FIELD

The present invention relates to a technique of a permanent electromagnetic holder and a conveyance device including the permanent electromagnetic holder.

BACKGROUND ART

Conventionally, a technique related to a permanent electromagnetic holder including a permanent magnet and a coil is known (see Patent Literature 1). The permanent electromagnetic holder is configured to be capable of attracting an object to be attracted by a magnetic force of the permanent magnet, and is configured to be in an attraction OFF state of the object to be attracted when the coil is energized.

In addition, there is known a technique related to a permanent electromagnetic attraction device that includes a first permanent magnet, a second permanent magnet, and a coil, and switches between an attraction ON state and an attraction OFF state of an object to be attracted by switching the magnetizing direction of the first permanent magnet through energization of the coil with the energizing direction switched (see Patent Literature 2).

The permanent electromagnetic attraction device has a high attraction force and does not require continuous energization of the coil in the attraction OFF state. Therefore, power consumption can be reduced.

CITATION LIST

Patent Literature

Patent Literature 1: JP-A 2019-102682 Gazette
Patent Literature 2: JP-A 2017-75020 Gazette

SUMMARY OF INVENTION

Technical Problems

However, in the permanent electromagnetic holder, the permanent magnet and an electromagnet are arranged side by side in the height direction (direction orthogonal to the attracting surface). Therefore, the permanent electromagnetic holder has a problem of increasing in size in the height direction.

In addition, in the permanent electromagnetic attraction device, the first permanent magnet and the second permanent magnet are arranged side by side in the height direction (direction orthogonal to the attracting surface). For this reason, even though the permanent electromagnetic attraction device has a high attraction force and consumes less power, there is a problem that the size thereof increases in the height direction.

The present invention has been made in view of the above circumstances, and an object thereof is to provide a permanent electromagnetic holder that can be relatively thin while having a high attraction force and consuming less power.

Solutions to Problems

The problems to be solved by the present invention are as described above, and means for solving the problems will be described below.

That is, according to a first aspect, there is provided a permanent electromagnetic holder including an attracting surface for an object to be attracted, configured to be capable of attracting the object to be attracted in an attraction ON state, and configured to be capable of detaching the object to be attracted that has been attracted in an attraction OFF state, the permanent electromagnetic holder including: a first magnet that is a magnet having a relatively small coercive force; a second magnet that is a rare-earth magnet having a relatively large coercive force and is configured in a ring shape; and a coil configured to magnetize the first magnet through energization of the coil, the first magnet being configured such that magnetic pole surfaces of different magnetic poles are oriented in a thrust direction of an axial center orthogonal to the attracting surface and passing through a center of the attracting surface, the second magnet being configured such that magnetic pole surfaces of different magnetic poles are oriented in the thrust direction of the axial center and being disposed outside the first magnet in a radial direction of the axial center, the coil being disposed between the first magnet and the second magnet, the first magnet, the second magnet, and the coil being arranged so as to overlap in the radial direction of the axial center, and an operation of switching an attraction ON/OFF state being carried out by switching a magnetizing direction of the first magnet through energization of the coil when the attraction ON/OFF state is switched.

A second aspect further includes a front yoke disposed close to the first magnet, the second magnet, and the coil on an attracting surface side in the thrust direction of the axial center of the first magnet, the second magnet, and the coil, and a part of the front yoke protrudes to a side opposite to an attracting surface side in the thrust direction of the axial center with respect to an attracting surface side end part of the coil on a first magnet side of the coil.

A third aspect further includes a back yoke in which a bottom part is disposed on a side opposite to an attracting surface side in the thrust direction of the axial center and an opening is disposed on the attracting surface side in the thrust direction of the axial center, and the first magnet, the second magnet, and the coil are disposed inside the back yoke, the front yoke is disposed so as to cover the opening of the back yoke, and a part of the back yoke protrudes to the attracting surface side in the thrust direction of the axial center with respect to an end part on a side opposite to an attracting surface side of the coil on a first magnet side of the coil.

According to a fourth aspect, there is provided a conveyance device including the permanent electromagnetic holder.

Advantageous Effects of Invention

The effects of the present invention are as follows.

That is, according to the present invention, it is possible to provide a thin structure while having a high attraction force and consuming less power.

DESCRIPTION OF EMBODIMENT

Figure 1:
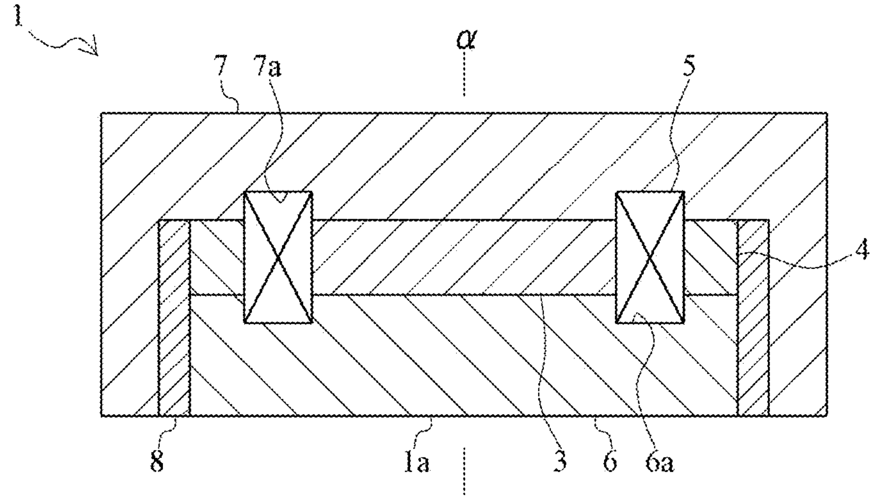
FIG. 1 is a cross-sectional view illustrating a permanent electromagnetic holder according to an embodiment of the present invention.
Figure 2A:
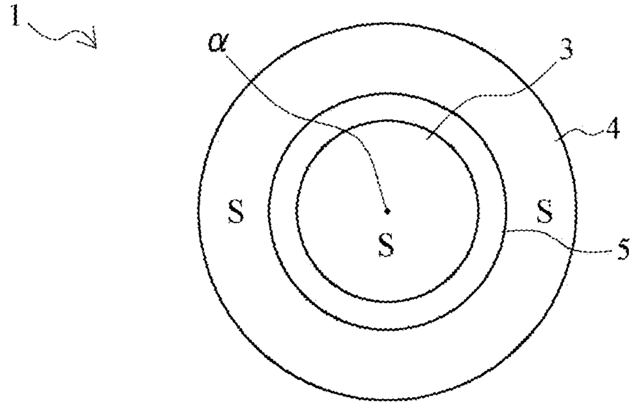
FIG. 2A is a schematic plan view illustrating a first magnet, a second magnet, and a coil in an attraction ON state of the permanent electromagnetic holder.
Figure 2B:
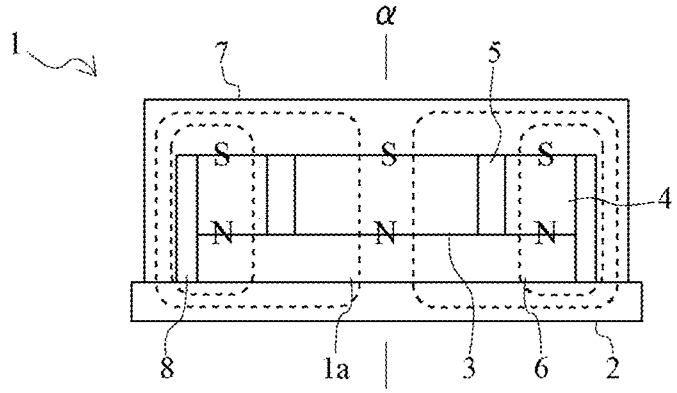
FIG. 2B is a schematic cross-sectional view illustrating the attraction ON state of the permanent electromagnetic holder.
Figure 3A:
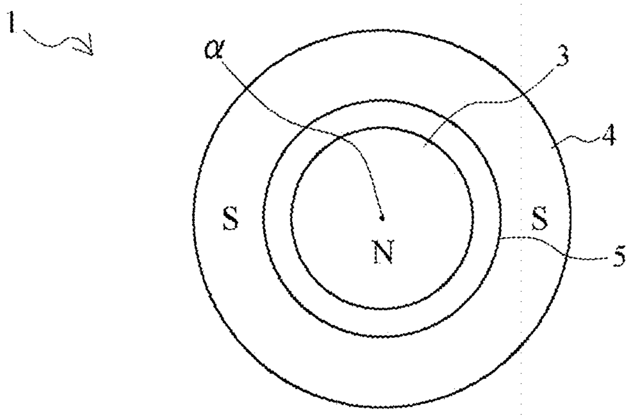
FIG. 3A is a schematic plan view illustrating the first magnet, the second magnet, and the coil in an attraction OFF state of the permanent electromagnetic holder.
Figure 3B:
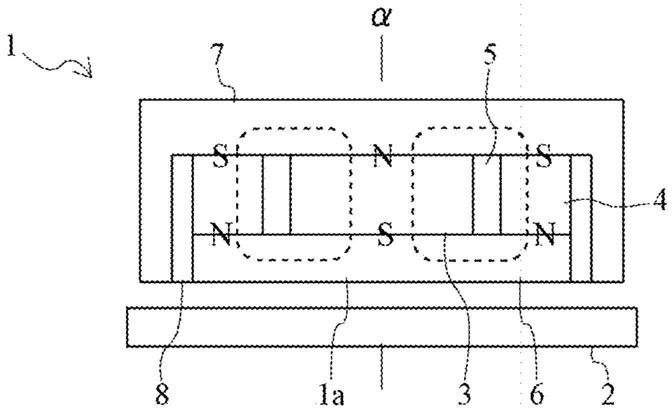
FIG. 3B is a schematic cross-sectional view illustrating the attraction OFF state of the permanent electromagnetic holder.

Next, a permanent electromagnetic holder 1 will be described with reference to FIGS. 1 to 6. Note that in the following, a description will be given assuming that a broken line in the drawings indicates a loop of a magnetic field line.

The permanent electromagnetic holder 1 is configured to be capable of attracting an iron product or the like (object 2 to be attracted) by using a magnetic force. The permanent electromagnetic holder 1 is configured to be capable of switching an attraction ON/OFF state. The permanent electromagnetic holder 1 is configured to be capable of attracting the object 2 to be attracted in the attraction ON state, and is configured to be capable of detaching the object 2 to be attracted that has been attracted in the OFF state.

The permanent electromagnetic holder 1 can be used for, for example, a conveyance device that conveys or transports an iron product or the like, or a holding device that holds a state in which an iron product is attracted to a wall surface, a top surface, or the like. Specific examples of usage of the permanent electromagnetic holder 1 include an industrial robot or a crane device that holds and conveys a workpiece by a magnetic force, an aircraft such as a helicopter or a drone that hangs and conveys a steel frame or the like by a magnetic force, and a wall climbing robot that moves while being attracted to a wall surface by a magnetic force.

As illustrated in FIGS. 1 to 3B, the permanent electromagnetic holder 1 is formed in a substantially columnar shape, and includes an attracting surface 1*a* for the object 2 to be attracted on one end side in the thrust direction of the axial center α. The axial center α is orthogonal to the attracting surface 1*a* and passes through the center of the attracting surface 1*a*. The thrust direction of the axial center α indicates a direction in which the axial center α extends (height direction of the permanent electromagnetic holder 1), and the radial direction of the axial center a indicates a direction orthogonal to the direction of the axial center α. The permanent electromagnetic holder 1 includes a first magnet 3, a second magnet 4, a coil 5, a front yoke 6, a back yoke 7, and a spacer 8.

Hereinafter, for convenience, a direction in which the attracting surface 1*a* of the object 2 to be attracted in the permanent electromagnetic holder 1 is oriented will be described as a downward direction; however, the direction of the permanent electromagnetic holder 1 is not limited thereto.

The first magnet 3 is a magnet (for example, an Alnico magnet, an iron-chromium-cobalt magnet, or the like) having a relatively small coercive force, and is formed in a columnar shape. The first magnet 3 is configured such that magnetic pole (S pole and N pole) surfaces of different magnetic poles are oriented in the thrust direction of the axial center α. The first magnet 3 is configured such that the magnetic pole surfaces of the different magnetic poles are orthogonal to the thrust direction of the axial center α.

The second magnet 4 is a rare-earth magnet (for example, a neodymium magnet) having a relatively large coercive force, and is formed in a tubular shape (ring shape). The height of the second magnet 4 is substantially the same as the height of the first magnet 3. The second magnet 4 is configured such that magnetic pole (S pole and N pole) surfaces of different magnetic poles are oriented in the thrust direction of the axial center α. The second magnet 4 is configured such that the magnetic pole surfaces of the different magnetic poles are orthogonal to the thrust direction of the axial center α.

The second magnet 4 is disposed outside the first magnet 3 in the radial direction (outside the first magnet 4 in the radial direction of the axial center α). The second magnet 4 is concentric with the first magnet 3.

The first magnet 3 and the second magnet 4 are disposed at the same position in the thrust direction of the axial center α. The first magnet 3 and the second magnet 4 are arranged so as to overlap in the radial direction of the axial center α. The upper surface position of the first magnet 3 and the upper surface position of the second magnet 4 match in the thrust direction of the axial center α, and the lower surface position of the first magnet 3 and the lower surface position of the second magnet 4 match in the thrust direction of the axial center α.

The coil 5 is a solenoid coil, and generates strong magnetic flux on the axial center α side (first magnet 3 side) to magnetize the first magnet 3 through energization thereof. The coil 5 switches the magnetizing direction of the first magnet 3 through energization thereof with the energizing direction switched.

The coil 5 is annularly arranged between the first magnet 3 and the second magnet 4. The coil 5 is disposed outside the first magnet 3 in the radial direction. The coil 5 is disposed inside the second magnet 4 in the radial direction. The coil 5 is configured to be close to the first magnet 3 and the second magnet 4.

The first magnet 3, the second magnet 4, and the coil 5 are arranged so as to overlap in the radial direction of the axial center α.

The front yoke 6 is a yoke made of a material such as iron, and is formed in a substantially flat disk shape. The front yoke 6 is disposed outside the first magnet 3, the second magnet 4, and the coil 5. The front yoke 6 is disposed below (on the attracting surface 1*a* side in the thrust direction of the axial center α of) the first magnet 3, the second magnet 4, and the coil 5 so as to be close to or in contact with them. The outer diameter of the front yoke 6 is substantially the same as the outer diameter of the second magnet 4.

The back yoke 7 is a yoke made of a material such as iron, and is formed in a substantially tubular shape having a bottom part and an opening. The bottom part of the back yoke 7 is disposed on the upper side, and the opening is disposed on the lower side. The inner diameter of the back yoke 7 is greater than the outer diameter of the front yoke 6.

The back yoke 7 is disposed outside the first magnet 3, the second magnet 4, and the coil 5. The first magnet 3, the second magnet 4, and the coil 5 are disposed inside the back yoke 7 (in the back yoke 7). The back yoke 7 is configured to be close to or in contact with the first magnet 3, the second magnet 4, and the coil 5. The bottom part of the back yoke 7 is located above the first magnet 3, the second magnet 4, and the coil 5, and the side wall of the back yoke 7 is located outside the first magnet 3, the second magnet 4, and the coil 5. The lower end part (lower opening) of the back yoke 7 is located below the first magnet 3, the second magnet 4, and the coil 5. The lower end surface of the back yoke 7 is substantially flush with the lower surface of the front yoke 6.

The front yoke 6 is disposed so as to cover the opening of the back yoke 7. The lower surface of the front yoke 6 and the lower end surface of the back yoke 7 constitute the attracting surface 1*a*.

The spacer 8 is made of a nonmagnetic material such as aluminum, and shields the magnetic flux of the first magnet 3 and the second magnet 4. The spacer 8 is fitted between the outer surfaces of the second magnet 4 and the front yoke 6 and the inner surface of the back yoke 7.

By energizing the coil 5 with the energizing direction switched, the magnetizing direction of the first magnet 3 is switched to switch the attraction ON state and the attraction OFF state of the object 2 to be attracted.

An operation of switching the attraction ON/OFF state is carried out by switching the magnetizing direction of the first magnet 3 through instantaneous energization of the coil 5 (energization OFF of the coil 5 immediately after energization ON of the coil 5) when the attraction ON/OFF state is switched. In the permanent electromagnetic holder 1, for example, the magnetizing direction (attraction ON/OFF state) of the first magnet 3 is switched in 0.01 seconds to 0.2 seconds after the start of energization to the coil 5.

In the attraction ON state, for example, in a case where the magnetic pole of the second magnet 4 on the attracting surface 1*a* side is an N pole, the magnetic pole of the first magnet 3 on the attracting surface 1*a* side becomes an N pole. As described above, the first magnet 3 is magnetized in the same direction as the magnetic poles of the second magnet 4, and is set to the attraction ON state (see FIGS. 2A and 2B).

In the attraction OFF state, for example, in a case where the magnetic pole of the second magnet 4 on the attracting surface 1*a* side is an N pole, the magnetic pole of the first magnet 3 on the attracting surface 1*a* side becomes an S pole. In this way, the magnetic flux of the first magnet 3 and the second magnet 4 is looped inside the front yoke 6 and the back yoke 7 so that the magnetic flux of the first magnet 3 and the second magnet 4 does not leak to the outside of the attracting surface 1*a*, and the attraction OFF state is established (see FIGS. 3A and 3B).

As described above, the first magnet 3 is configured such that the magnetic pole surfaces of the different magnetic poles are oriented in the thrust direction of the axial center α, the second magnet 4 is configured such that the magnetic pole surfaces of the different magnetic poles are oriented in the thrust direction of the axial center α, the first magnet 3, the second magnet 4, and the coil 5 are arranged so as to overlap in the radial direction of the axial center α, and the operation of switching the attraction ON/OFF state is carried out by switching the magnetizing direction of the first magnet 3 through energization (instantaneous energization) of the coil 5 when the attraction ON/OFF state is switched. Therefore, the permanent electromagnetic holder 1 can be configured to be thin while having a high attraction force and reducing power consumption as compared with a conventional permanent electromagnetic holder or the like.

In addition, in the conventional permanent electromagnetic holder, in a case where the magnetic force of the permanent magnet is relatively large, it is conceivable that the coil is configured to be relatively large so that the magnetic force of the permanent magnet can be canceled. If the coil is configured to be relatively large in this manner, the size of the permanent electromagnetic holder is increased on the radial direction (radial direction of the axial center) side of the attracting surface. However, in the permanent electromagnetic holder 1 configured as described above, it is possible to suppress an increase in size on the radial direction side of the axial center α while providing a high attraction force as compared with a conventional permanent electromagnetic holder in which the permanent magnet has a relatively strong magnetic force and the coil is relatively large.

After switching the attraction ON/OFF state, the permanent electromagnetic holder 1 maintains the attraction ON/OFF state after the switching even when the coil 5 is not energized until the next operation of switching the attraction ON/OFF state is carried out.

Therefore, in the permanent electromagnetic holder 1, for example, it is possible to prevent a magnetic body or the like from being erroneously attracted when the power supply is turned off so that energization is unintentionally stopped and the attraction ON state is established as in the conventional permanent electromagnetic holder. In addition, for example, as in the conventional permanent electromagnetic holder, it is possible to prevent an operation of attracting a magnetic body or the like from being erroneously started when energization is unintentionally stopped before positioning of the hanging position.

As illustrated in FIG. 1, the front yoke 6 is configured such that a groove 6*a* is formed in an upper surface (surface on a side where the first magnet 3, the second magnet 4, or the coil 5 is disposed in thrust direction of the axial center α) and a step is formed on the upper surface.

The groove 6*a* of the front yoke 6 is a square groove, is formed in an annular shape in plan view, and is formed concentric with the first magnet 3 or the second magnet 4. The outer diameter of the groove 6*a* of the front yoke 6 is substantially the same as the inner diameter of the second magnet 4. The inner diameter of the groove 6*a* of the front yoke 6 is substantially the same as the outer diameter of the first magnet 3.

A part (lower part) of the coil 5 is disposed in the groove 6*a* of the front yoke 6. A lower end part (an end part on the attracting surface 1*a* side) of the coil 5 is disposed so as to bite into an upper part of the front yoke 6. Inside the coil 5 (on the first magnet 3 side), a part of the front yoke 6 protrudes upward (side on which the first magnet 3, the second magnet 4, or the coil 5 is disposed in the thrust direction of axial center α (side opposite to the attracting surface 1*a* side in the thrust direction of the axial center α))

with respect to the lower end part (end part on the attracting surface 1*a* side) of the coil 5. Outside the coil 5 (on the second magnet 4 side), a part of the front yoke 6 protrudes above the lower end part of the coil 5.

As described above, the end part on the attracting surface 1*a* side of the coil 5 is arranged so as to bite into the upper part of the front yoke 6, and on the first magnet 3 side of the coil 5, a part of the front yoke 6 protrudes to the side opposite to the attracting surface 1*a* side in the thrust direction of the axial center α with respect to the end part on the attracting surface 1*a* side of the coil 5. Therefore, in the permanent electromagnetic holder 1, the magnetic flux to the axial center α side (first magnet 3 side) can be increased, and magnetization of the first magnet 3 can be performed with relatively low power consumption.

The back yoke 7 is configured such that a groove 7*a* is formed in a lower surface (surface on a side where the first magnet 3, the second magnet 4, or the coil 5 is disposed in thrust direction of the axial center α) of the bottom part and a step is formed on the lower surface.

The groove 7*a* of the back yoke 7 is a square groove, is formed in an annular shape in bottom view, and is formed concentric with the first magnet 3 or the second magnet 4. The outer diameter of the groove 7*a* of the back yoke 7 is substantially the same as the inner diameter of the second magnet 4. The inner diameter of the groove 7*a* of the back yoke 7 is substantially the same as the outer diameter of the first magnet 3.

A part (upper part) of the coil 5 is disposed in the groove 7*a* of the back yoke 7. An upper end part (end part on the side opposite to the attracting surface 1*a* side) of the coil 5 is disposed so as to bite into the bottom part of the back yoke 7. Inside the coil 5 (on the first magnet 3 side), a part of the back yoke 7 protrudes downward (side on which the first magnet 3, the second magnet 4, or the coil 5 is disposed in the thrust direction of the axial center α (attracting surface 1*a* side in the thrust direction of the axial center α)) with respect to the upper end part (end part on the side opposite to the attracting surface 1*a* side) of the coil 5. Outside the coil 5 (on the second magnet 4 side), a part of the back yoke 7 protrudes below the upper end part of the coil 5.

As described above, the end part on the side opposite to the attracting surface 1*a* side of the coil 5 is arranged so as to bite into the bottom part of the back yoke 7, and the back yoke 7 is configured such that on the first magnet 3 side of the coil 5, a part of the back yoke 7 protrudes to the side opposite to the attracting surface 1*a* side in the thrust direction of the axial center α with respect to the end part on the side opposite to the attracting surface 1*a* side of the coil 5. Therefore, in the permanent electromagnetic holder 1, the magnetic flux to the axial center α side (first magnet 3 side) can be increased, and magnetization of the first magnet 3 can be performed with relatively low power consumption.

The permanent electromagnetic holder 1 may not be formed in a columnar shape, and may be formed in a polygonal shape (for example, a quadrangular prism). The first magnet 3 may not be formed in a columnar shape, and the second magnet 4 may not be formed in a tubular shape. That is, the first magnet 3 can be formed in a polygonal pole shape (for example, a quadrangular prism), and the second magnet 4 can be formed in a polygonal tube shape for example, a rectangular tube shape).

The second magnet 4 may be formed in a ring shape by arranging a plurality of rare-earth magnets having a predetermined shape (for example, a fan shape).

The groove 6*a* of the front yoke 6 or the groove 7*a* of the back yoke 7 may be a groove having a circular shape, a polygonal shape, or the like.

Figure 4:
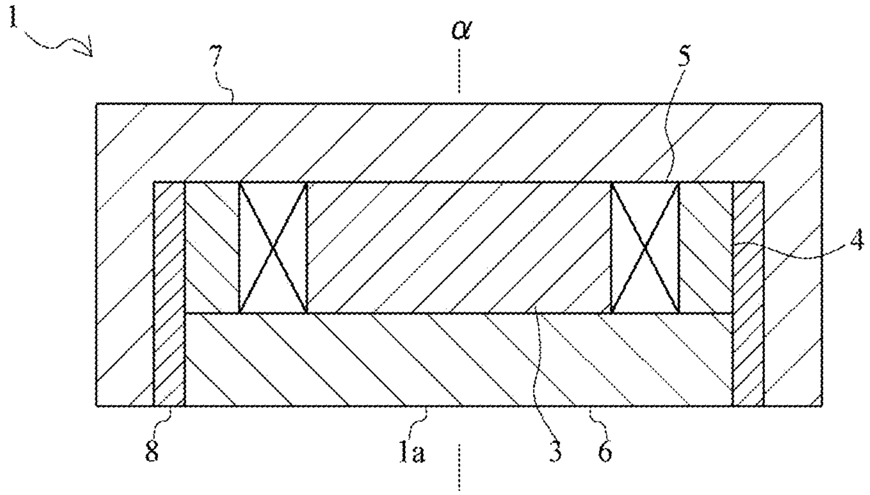
FIG. 4 is a cross-sectional view illustrating a permanent electromagnetic holder.

Note that in the permanent electromagnetic holder 1, as illustrated in FIG. 4, the front yoke 6 may have a flat upper surface without the groove 6*a* in the upper surface, and the back yoke 7 may have a flat lower surface of the bottom part without the groove 7*a* in the lower surface of the bottom part. With this configuration, the permanent electromagnetic holder 1 can be manufactured relatively easily.

Figure 5:
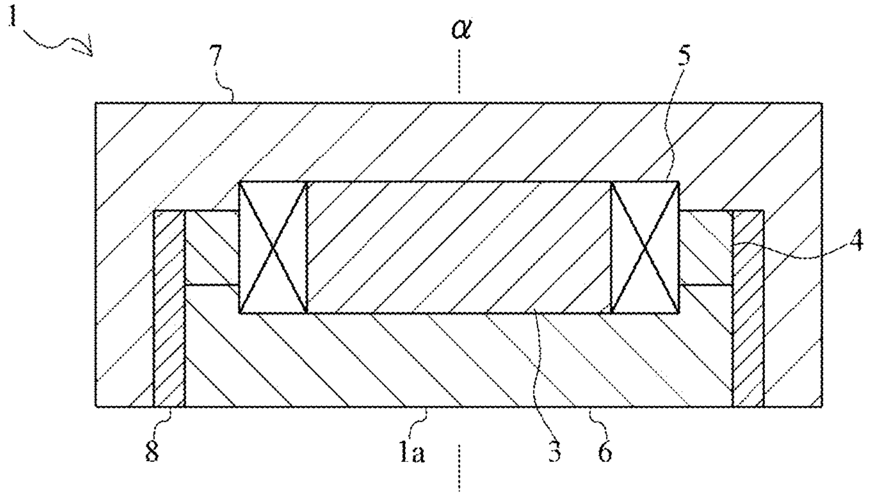
FIG. 5 is a cross-sectional view illustrating a permanent electromagnetic holder.

The permanent electromagnetic holder 1 can also be configured such that the height of the second magnet 4 is different from the height of the first magnet 3. At this time, for example, as illustrated in FIG. 5, the length (height) in the thrust direction of the axial center α of the second magnet 4 is shorter than the length (height) in the thrust direction of the axial center α of the first magnet 3. A recess is formed in the upper surface of the front yoke 6, and a recess is formed in the lower surface of the bottom part of the back yoke 7. The outer diameter of the recess of the front yoke 6 and the outer diameter of the recess of the back yoke are formed to be substantially the same as the inner diameter of the second magnet 4. The first magnet 3 and the coil 5 are disposed in the recess of the front yoke 6 and the recess of the back yoke.

Figure 6:
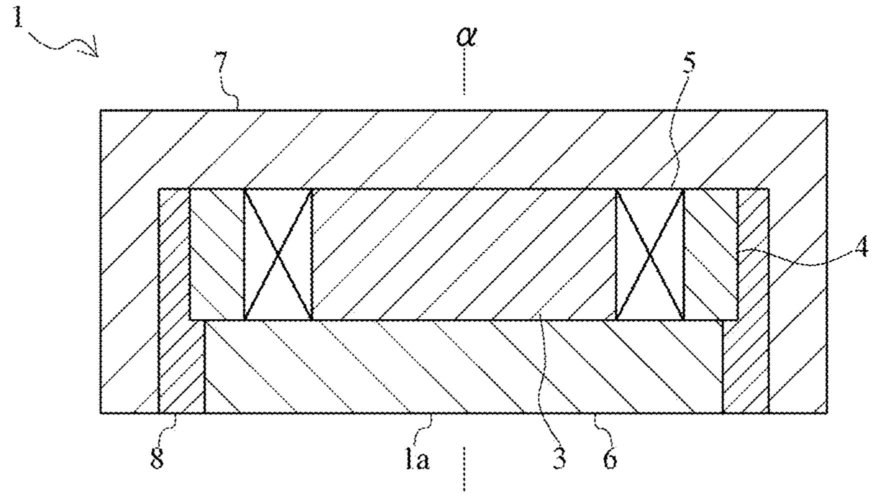
FIG. 6 is a cross-sectional view illustrating a permanent electromagnetic holder.
Figure 7:
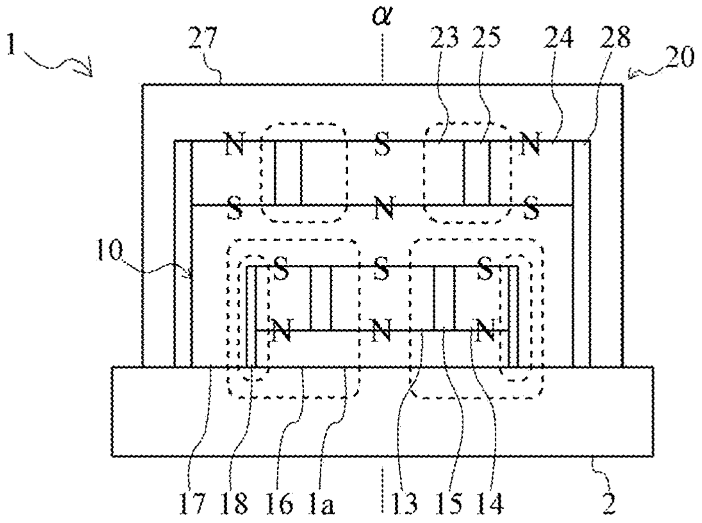
FIG. 7 is a schematic cross-sectional view illustrating an attraction ON state of a permanent electromagnetic holder.
Figure 8:
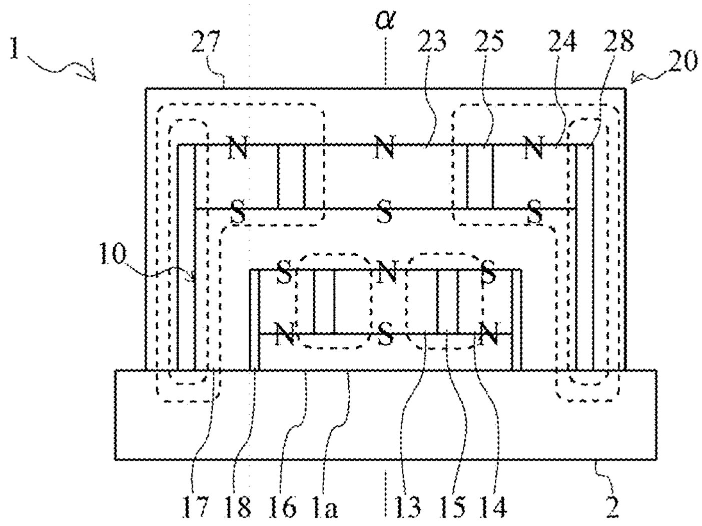
FIG. 8 is a schematic cross-sectional view illustrating the attraction ON state of the permanent electromagnetic holder.
Figure 9:
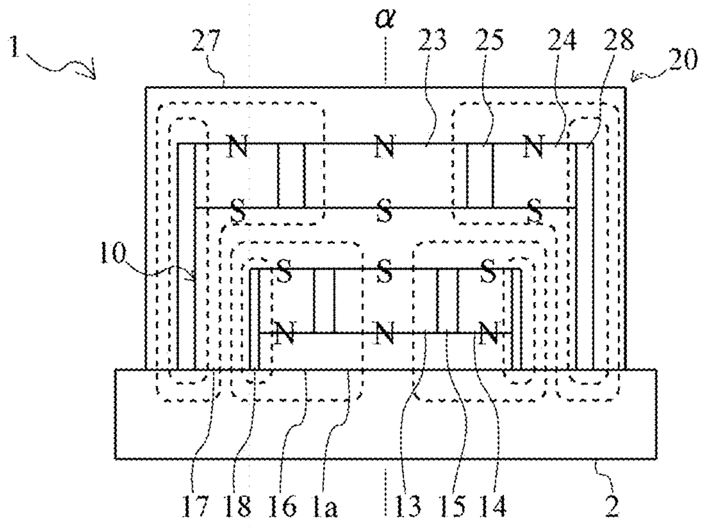
FIG. 9 is a schematic cross-sectional view illustrating the attraction ON state of the permanent electromagnetic holder.
Figure 10:
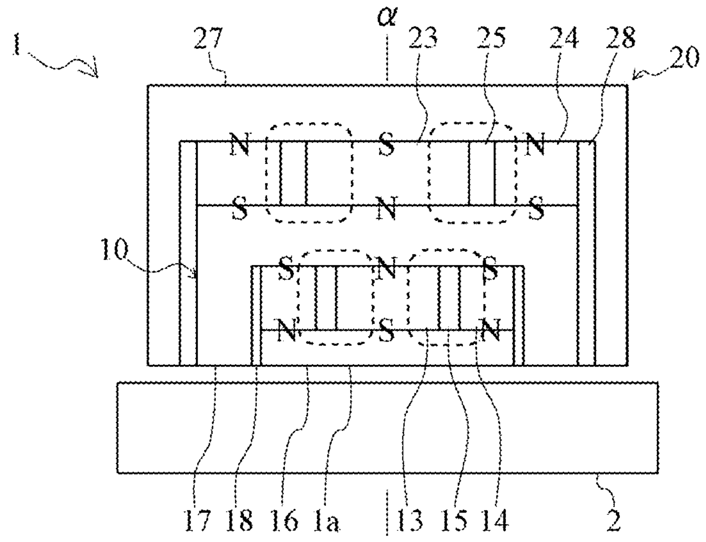
FIG. 10 is a schematic cross-sectional view illustrating the attraction OFF state of the permanent electromagnetic holder.

The permanent electromagnetic holder 1 can also be configured such that the outer diameter of the front yoke 6 is different from the outer diameter of the second magnet 4. At this time, for example, as illustrated in FIG. 6, the outer diameter of the front yoke 6 is shorter than the outer diameter of the second magnet 4.

Next, a permanent electromagnetic holder 1 illustrated in FIGS. 7 to 10 will be described.

Note that in the description of the permanent electromagnetic holder 1 illustrated in FIGS. 7 to 10, the description of parts similar to those of the permanent electromagnetic holder 1 illustrated in FIGS. 1 to 6 will be omitted as appropriate, and parts different from those of the permanent electromagnetic holder 1 illustrated in FIGS. 1 to 6 will be mainly described.

As illustrated in FIGS. 7 to 10, the permanent electromagnetic holder 1 includes a first magnet part 10 and a second magnet part 20, and is configured such that the first magnet part 10 and the second magnet part 20 are arranged side by side in the thrust direction of the axial center α. The first magnet part 10 is disposed closer to the attracting surface 1*a* side than the second magnet part 20 is in the thrust direction of the axial center α.

The first magnet part 10 includes a first magnet 13, a second magnet 14, a first coil 15, a front yoke 16, a first back yoke 17, and a spacer 18.

The first magnet 13 is a magnet (for example, an Alnico magnet, an iron-chromium-cobalt magnet, or the like) having a relatively small coercive force, and is formed in a columnar shape. The first magnet 13 is configured such that magnetic pole (S pole and N pole) surfaces of different magnetic poles are oriented in the thrust direction of the axial center α. The first magnet 13 is configured such that the magnetic pole surfaces of the different magnetic poles are orthogonal to the thrust direction of the axial center α.

The second magnet 14 is a rare-earth magnet (for example, a neodymium magnet) having a relatively large coercive force, and is formed in a tubular shape (ring shape). The height of the second magnet 14 is substantially the same as the height of the first magnet 13. The second magnet 14 is configured such that magnetic pole (S pole and N pole) surfaces of different magnetic poles are oriented in the thrust direction of the axial center α. The second magnet 14 is configured such that the magnetic pole surfaces of the different magnetic poles are orthogonal to the thrust direction of the axial center α.

The first magnet 13 and the second magnet 14 are disposed at the same position in the thrust direction of the axial center α.

The first coil 15 is a solenoid coil, and generates strong magnetic flux on the axial center a side (first magnet 13 side) through energization thereof to magnetize the first magnet 13. The coil 15 switches the magnetizing direction of the first magnet 13 through energization thereof with the energizing direction switched.

The first coil 15 is disposed between the first magnet 13 and the second magnet 14. The first coil 15 is disposed outside the first magnet 13 in the radial direction. The first coil 15 is disposed inside the second magnet 14 in the radial direction. The first coil 15 is configured to be close to the first magnet 13 and the second magnet 14.

The first magnet 13, the second magnet 14, and the first coil 15 are arranged so as to overlap in the radial direction of the axial center α.

The front yoke 16 is a yoke made of a material such as iron, and is formed in a substantially flat disk shape. The front yoke 16 is disposed below the first magnet 13, the second magnet 14, and the first coil 15 so as to be close to or in contact with them.

The first back yoke 17 is a yoke made of a material such as iron, and is formed in a substantially tubular shape having a bottom part and an opening. The bottom part of the first back yoke 17 is disposed on the upper side, and the opening is disposed on the lower side. The inner diameter of the first back yoke 17 is greater than the outer diameter of the front yoke 16.

The first back yoke 17 is disposed outside the first magnet 13, the second magnet 14, and the first coil 15. The first magnet 13, the second magnet 14, and the first coil 15 are disposed inside the first back yoke 17. The first back yoke 17 is configured to be close to or in contact with the first magnet 13, the second magnet 14, and the first coil 15. The bottom part of the first back yoke 17 is located above the first magnet 13, the second magnet 14, and the first coil 15, and the side wall of the first back yoke 17 is located outside the first magnet 13, the second magnet 14, and the first coil 15. The lower end part (lower opening) of the first back yoke 17 is located lower than the first magnet 13, the second magnet 14, and the first coil 15. The lower end surface of the first back yoke 17 is substantially flush with the lower surface of the front yoke 16.

The front yoke 16 is disposed so as to cover the opening of the first back yoke 17.

The spacer 18 is made of a nonmagnetic material such as aluminum, and shields the magnetic flux of the first magnet 13, the second magnet 14, a third magnet 23, and a fourth magnet 24. The spacer 18 is fitted between the outer surfaces of the second magnet 14 and the front yoke 16 and the inner surface of the first back yoke 17.

The second magnet part 20 includes the third magnet 23, the fourth magnet 24, a second coil 25, a second back yoke 27, and a spacer 28.

The third magnet 23 is a magnet (for example, an Alnico magnet, an iron-chromium-cobalt magnet, or the like) having a relatively small coercive force, and is formed in a columnar shape. The outer diameter of the third magnet 23 is greater than the inner diameter of the second magnet 14 and smaller than the outer diameter of the second magnet 14. The third magnet 23 is configured such that its magnetic pole surfaces are oriented in the thrust direction of the axial center α. The third magnet 23 is configured such that the magnetic pole (S pole and N pole) surfaces of different magnetic poles are orthogonal to the thrust direction of the axial center α.

The third magnet 23 is disposed above the first back yoke 17 so as to be close to or in contact with the upper surface of the first back yoke 17. The third magnet 23 is concentric with the axial center of the first magnet 13 and the second magnet 14.

The fourth magnet 24 is a rare-earth magnet (for example, a neodymium magnet) having a relatively large coercive force, and is formed in a tubular shape (ring shape). The height of the fourth magnet 24 is substantially the same as the height of the third magnet 23. The outer diameter of the fourth magnet 24 is greater than the outer diameter of the second magnet 14. The fourth magnet 24 is configured such that magnetic pole (S pole and N pole) surfaces of different magnetic poles are oriented in the thrust direction of the axial center α. The fourth magnet 24 is configured such that the magnetic pole surfaces of the different magnetic poles are orthogonal to the thrust direction of the axial center α.

The fourth magnet 24 is disposed above the first back yoke 17 so as to be close to or in contact with the upper surface of the first back yoke 17. The fourth magnet 24 is disposed outside the third magnet 23 in the radial direction (outside the third magnet 23 in the radial direction of the axial center α). The fourth magnet 24 is concentric with the first magnet 13, the second magnet 14, and the third magnet 23.

The third magnet 23 and the fourth magnet 24 are disposed at the same position in the thrust direction of the axial center α. The third magnet 23 and the fourth magnet 24 are arranged so as to overlap in the radial direction of the axial center α. The upper surface position of the third magnet 23 and the upper surface position of the fourth magnet 24 match in the thrust direction of the axial center α, and the lower surface position of the third magnet 23 and the lower surface position of the fourth magnet 24 match in the thrust direction of the axial center α.

The second coil 25 is a solenoid coil, and generates strong magnetic flux on the axial center α side (third magnet 23 side) to magnetize the third magnet 23 through energization thereof. The second coil 25 switches the magnetizing direction of the third magnet 23 through energization thereof with the energizing direction switched.

The second coil 25 is disposed between the third magnet 23 and the fourth magnet 24. The second coil 25 is disposed outside the third magnet 23 in the radial direction. The second coil 25 is disposed inside the fourth magnet 24 in the radial direction. The second coil 25 is configured to be close to the third magnet 23 and the fourth magnet 24.

The third magnet 23, the fourth magnet 24, and the second coil 25 are arranged so as to overlap in the radial direction of the axial center α.

The second back yoke 27 is a yoke made of a material such as iron, and is formed in a substantially tubular shape having a bottom part and an opening. The bottom part of the second back yoke 27 is disposed on the upper side, and the opening is disposed on the lower side. The inner diameter of the second back yoke 27 is greater than the outer diameter of the first back yoke 17.

The second back yoke 27 is disposed outside the first magnet part 10 (the first magnet 13, the second magnet 14, and the first coil 15), the third magnet 23, the fourth magnet 24, and the second coil 25. The first magnet part 10 (the first magnet 13, the second magnet 14, and the first coil 15), the third magnet 23, the fourth magnet 24, and the second coil 25 are disposed inside the second back yoke 27. The second back yoke 27 is configured to be close to or in contact with the third magnet 23, the fourth magnet 24, and the second coil 25. The bottom part of the second back yoke 27 is located above the third magnet 23, the fourth magnet 24, and the second coil 25, and the side wall of the second back yoke 27 is located outside the first magnet part 10 (the first magnet 13, the second magnet 14, and the first coil 15), the third magnet 23, the fourth magnet 24, and the second coil 25. The lower end part (lower opening) of the second back yoke 27 is located lower than the third magnet 23, the fourth magnet 24, and the second coil 25. The lower end surface of the second back yoke 27 is substantially flush with the lower surface of the front yoke 16 and the lower end surface of the first back yoke 17.

The spacer 28 is made of a nonmagnetic material such as aluminum, and shields the magnetic flux of the first magnet 13, the second magnet 14, the third magnet 23, and the fourth magnet 24. The spacer 28 is fitted between the outer surfaces of the fourth magnet 24 and the first back yoke 17 and the inner surface of the second back yoke 27.

The lower surface of the front yoke 16, the lower end surface of the first back yoke 17, and the lower end surface of the second back yoke 27 constitute the attracting surface 1*a*.

By switching the energizing directions and energizing the first coil 15 and/or the second coil 25, the magnetizing directions of the first magnet 13 and/or the third magnet 23 are switched, and the attraction ON state and the attraction OFF state of an object 2 to be attracted are switched.

An operation of switching the attraction ON/OFF state is carried out by switching the magnetizing direction of the first magnet 13 and/or the magnetizing direction of the third magnet 23 through instantaneous energization of the first coil 15 and/or the second coil 25 (energization OFF of the first coil 15 and/or the second coil 25 immediately after energization ON of the first coil 15 and/or the second coil 25) when the attraction ON/OFF state is switched. For example, in the permanent electromagnetic holder 1, the magnetizing direction of the first magnet 13 and/or the magnetizing direction of the third magnet 23 (attraction ON/OFF state) are switched in 0.01 seconds to 0.2 seconds after the start of energization to the first coil 15 and/or the second coil 25.

For example, in the attraction ON state, in a case where the magnetic pole of the second magnet 14 on the attracting surface 1*a* side is a N pole and the magnetic pole of the fourth magnet 24 on the attracting surface 1*a* side is a S pole, by energizing only the first coil 15, the magnetic pole of the first magnet 13 on the attracting surface 1*a* side becomes a N pole. In this manner, the first magnet 13 is magnetized in the same direction as the magnetic poles of the second magnet 14, and the attraction ON state is established (see FIG. 7).

In addition, for example, in the attraction ON state, in a case where the magnetic pole of the second magnet 14 on the attracting surface 1*a* side is a N pole and the magnetic pole of the fourth magnet 24 on the attracting surface 1*a* side is a S pole, by energizing only the second coil 25, the magnetic pole of the third magnet 23 on the attracting surface 1*a* side becomes a S pole. In this manner, the third magnet 23 is magnetized in the same direction as the magnetic poles of the fourth magnet 24, and the attraction ON state is established (see FIG. 8). At this time, as compared with a case where only the first coil 15 is energized and the attraction ON state is established, a stronger attraction force for attracting the object 2 to be attracted is generated.

Furthermore, for example, in the attraction ON state, in a case where the magnetic pole of the second magnet 14 on the attracting surface 1*a* side is a N pole and the magnetic pole of the fourth magnet 24 on the attracting surface 1*a* side is a S pole, by energizing the first coil 15 and the second coil 25, the magnetic pole of the first magnet 13 on the attracting surface 1*a* side becomes a N pole and the magnetic pole of the third magnet 23 on the attracting surface 1*a* side becomes a S pole. In this manner, the first magnet 13 is magnetized in the same direction as the magnetic poles of the second magnet 14, the third magnet 23 is magnetized in the same direction as the magnetic poles of the fourth magnet 24, and the attraction ON state is established (see FIG. 9). At this time, as compared with the case where only the first coil 15 is energized or only the second coil 25 is energized to be in the attraction ON state, a stronger attraction force for attracting the object 2 to be attracted is generated.

In the attraction OFF state, for example, in a case where the magnetic pole of the second magnet 14 on the attracting surface 1*a* side is a N pole and the magnetic pole of the fourth magnet 24 on the attracting surface 1*a* side is a S pole, the magnetic pole of the first magnet 13 on the attracting surface 1*a* side becomes a S pole and the magnetic pole of the third magnet 23 on the attracting surface 1*a* side becomes a N pole. In this way, the magnetic flux of the first magnet 13, the second magnet 14, the third magnet 23, and the fourth magnet 24 is looped inside the front yoke 16, the first back yoke 17, and the second back yoke 27 so that the magnetic flux of the first magnet 13, the second magnet 14, the third magnet 23, and the fourth magnet 24 does not leak to the outside of the attracting surface 1*a*, and the attraction OFF state is established (see FIG. 10).

As described above, the first magnet part 10 is disposed closer to the attracting surface 1*a* than the second magnet part 20 is in the thrust direction of the axial center α, the first magnet 13 is configured such that the magnetic pole surfaces of the different magnetic poles are oriented in the thrust direction of the axial center α, the second magnet 14 is configured such that the magnetic pole surfaces of the different magnetic poles are oriented in the thrust direction of the axial center α, the first magnet 13, the second magnet 14, and the first coil 15 are disposed so as to overlap in the radial direction of the axial center α, the third magnet 23 is configured such that the magnetic pole surfaces of the different magnetic poles are oriented in the thrust direction of the axial center α, the fourth magnet 24 is configured such that the magnetic pole surfaces of the different magnetic poles are oriented in the thrust direction of the axial center α, and the third magnet 23, the fourth magnet 24, and the second coil 25 are arranged so as to overlap in the radial direction of the axial center α. The operation of switching the attraction ON/OFF state is carried out by switching the magnetizing direction of the first magnet 13 and the magnetizing direction of the third magnet 23 through energization (instantaneous energization) of the first coil 15 and/or the second coil 25 when the attraction ON/OFF state is switched. Therefore, the permanent electromagnetic holder 1 can be configured to be relatively thin in the configuration in which the first magnet part 10 and the second magnet part 20 are arranged side by side in the thrust direction of the axial center α while having a higher attraction force and reducing power consumption as compared with a conventional permanent electromagnetic holder and the like.

When the attraction ON/OFF state is switched, a mode of energizing the coil (the first coil 15 and/or the second coil 25) can be selected from among energizing the first coil 15, energizing the second coil 25, and energizing the first coil 15 and/or the second coil 25. The mode of energizing the coil is selected by, for example, a worker operating an operation switch or the like.

For example, in a case where the attraction force for attracting the object 2 to be attracted is desired to be relatively weak, only the first coil 15 is selected to be energized when the attraction ON/OFF state is switched.

In addition, for example, in a case where the attraction force for attracting the object 2 to be attracted is desired to be stronger than that when only the first coil 15 is energized, only the second coil 25 is selected to be energized when the attraction ON/OFF state is switched.

Furthermore, for example, in a case where the attraction force for attracting the object 2 to be attracted is desired to be stronger than that when only the first coil 15 is energized or only the second coil 25 is energized, the first coil 15 and the second coil 25 are selected to be energized when the attraction ON/OFF state is switched.

As described above, when the attraction ON/OFF state is switched, it is possible to select the mode of energizing the coil among energizing the first coil 15, energizing the second coil 25, and energizing the first coil 15 and the second coil 25. Therefore, it is possible to configure settings to change the attraction force for attracting the object 2 to be attracted according to the specifications of the object 2 to be attracted, usage of the permanent electromagnetic holder 1, and the like.

Note that the permanent electromagnetic holder 1 can also be configured such that only the first coil 15 and the second coil 25 can be energized when the attraction ON/OFF state is switched.

The front yoke 16 is configured such that a groove (not illustrated) is formed in an upper surface thereof and a step is formed on the upper surface.

A part (lower part) of the first coil 15 is disposed in the groove of the front yoke 16. A lower end part (an end part on the attracting surface 1*a* side) of the first coil 15 is disposed so as to bite into an upper part of the front yoke 16. Inside (first magnet 13 side) the first coil 15, a part of the front yoke 16 protrudes above a lower end part (end part on the attracting surface 1*a* side) of the first coil 15. Outside the first coil 15 (on the second magnet 14 side), a part of the front yoke 16 protrudes above the lower end part of the first coil 15.

As described above, the end part on the attracting surface 1*a* side of the first coil 15 is arranged so as to bite into the upper part of the front yoke 16, and on the first magnet 13 side of the first coil 15, a part of the front yoke 16 protrudes to the side opposite to the attracting surface 1*a* side in the thrust direction of the axial center α with respect to the end part on the attracting surface 1*a* side of the first coil 15. Therefore, in the permanent electromagnetic holder 1, the magnetic flux to the axial center α side (first magnet 13 side) can be increased, and magnetization of the first magnet 13 can be performed with relatively low power consumption.

The first back yoke 17 is configured such that a groove (not illustrated) is formed in a lower surface of the bottom part and a step is formed on the lower surface.

A part (upper part) of the first coil 15 is disposed in the groove of the first back yoke 17. An upper end part (end part on the side opposite to the attracting surface 1*a* side) of the first coil 15 is disposed so as to bite into the bottom part of the first back yoke 17. Inside the first coil 15 (on the first magnet 13 side), a part of the first back yoke 17 protrudes downward (side on which the first magnet 13, the second magnet 14, or the first coil 15 is disposed in the thrust direction of the axial center α (attracting surface 1*a* side in the thrust direction of the axial center α)) with respect to the upper end part (end part on the side opposite to the attracting surface 1*a* side) of the first coil 15. Outside the first coil 15 (on the second magnet 14 side), part of the first back yoke 17 protrudes below the upper end part of the first coil 15.

As described above, the end part on the side opposite to the attracting surface 1*a* side of the first coil 15 is arranged so as to bite into the bottom part of the first back yoke 17, and the first back yoke 17 is configured such that on the first magnet 13 side of the first coil 15, a part of the first back yoke 17 protrudes to the attracting surface 1*a* side in the thrust direction of the axial center α with respect to the end part on the side opposite to the attracting surface 1*a* side of the first coil 15. Therefore, in the permanent electromagnetic holder 1, the magnetic flux to the axial center α side (first magnet 13 side) can be increased, and magnetization of the first magnet 13 can be performed with relatively low power consumption.

Similarly to the front yoke 16, the second back yoke 27 can also be configured such that a groove (not illustrated) is formed in an upper surface of the bottom part and a step is formed on the upper surface.

A part (lower part) of the second coil 25 is disposed in the groove of the second back yoke 27. A lower end part (end part on the attracting surface 1*a* side) of the second coil 25 is disposed so as to bite into an upper part of the second back yoke 27. Inside (third magnet 23 side of) the second coil 25, a part of the second back yoke 27 protrudes above a lower end part (end part on the attracting surface 1*a* side) of the second coil 25. Outside the second coil 25 (on the fourth magnet 24 side), a part of the second back yoke 27 protrudes above the lower end part of the second coil 25.

As described above, the end part on the attracting surface 1*a* side of the second coil 25 is arranged so as to bite into the upper part of the second back yoke 27, and on the third magnet 23 side of the second coil 25, a part of the second back yoke 27 protrudes to the side opposite to the attracting surface 1*a* side in the thrust direction of the axial center α with respect to the end part on the attracting surface 1*a* side of the second coil 25. Therefore, in the permanent electromagnetic holder 1, the magnetic flux to the axial center α side (first magnet 13 side) can be increased, and magnetization of the first magnet 13 can be performed with relatively low power consumption.

Similarly to the first back yoke 17, the second back yoke 27 can also be configured such that a groove (not illustrated) is formed in a lower surface of the bottom part and a step is formed on the lower surface.

A part (upper part) of the second coil 25 is disposed in the groove of the second back yoke 27. An upper end part (end part on the side opposite to the attracting surface 1*a* side) of the second coil 25 is disposed so as to bite into the bottom part of the second back yoke 27. Inside the second coil 25 (on the third magnet 23 side), a part of the second back yoke 27 protrudes downward (side on which the third magnet 23, the fourth magnet 24, or the second coil 25 is disposed in the thrust direction of the axial center α (attracting surface 1*a* side in the thrust direction of the axial center α)) with respect to the upper end part (end part on the side opposite to the attracting surface 1*a* side) of the second coil 25. Outside the second coil 25 (on the fourth magnet 24 side), a part of the second back yoke 27 protrudes below the upper end part of the second coil 25.

As described above, the end part on the side opposite to the attracting surface 1_a_ side of the second coil 25 is arranged so as to bite into the bottom part of the second back yoke 27, and the second back yoke 27 is configured such that on the third magnet 23 side of the second coil 25, a part of the second back yoke 27 protrudes to the attracting surface 1_a_ side in the thrust direction of the axial center α with respect to the end part on the side opposite to the attracting surface 1_a_ side of the second coil 25. Therefore, in the permanent electromagnetic holder 1, the magnetic flux to the axial center α side (third magnet 23 side) can be increased, and magnetization of the third magnet 23 can be performed with relatively low power consumption.

Note that the permanent electromagnetic holder 1 can also be configured such that three or more magnet parts are arranged side by side in the thrust direction of the axial center α in addition to the first magnet part 10 and the second magnet part 20.

The second magnet 14 or the fourth magnet 24 may be formed in a ring shape by arranging a plurality of rare-earth magnets having a predetermined shape (for example, a fan shape).

The groove of the front yoke 16, the second back yoke 17, or the second back yoke 27 may be a groove having a circular shape, a polygonal shape, or the like.

Figure 11:
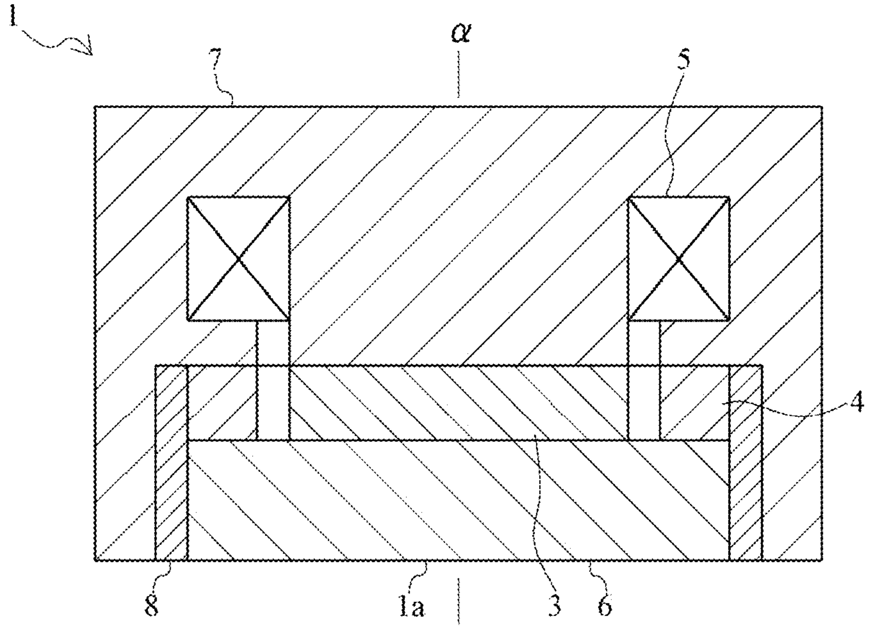
FIG. 11 is a cross-sectional view illustrating a permanent electromagnetic holder.

In the permanent electromagnetic holder 1, as illustrated in FIG. 11, the coil 5 may be disposed above the second magnet 4 (on the side opposite to the attracting surface 1_a_ side in the thrust direction of the axial center α) so as to bite into the back yoke 7. At this time, the first magnet 3 and the second magnet 4 are disposed so as to overlap in the radial direction of the axial center α, the coil 5 is disposed outside the first magnet 3 in the radial direction and above the second magnet 4, and the coil 5 and the second magnet 4 are disposed so as to overlap in the thrust direction of the axial center α.

With this configuration, in the permanent electromagnetic holder 1, the magnetic flux to the axial center α side (first magnet 3 side) can be increased, and magnetization of the first magnet 3 can be performed with relatively low power consumption.

INDUSTRIAL APPLICABILITY

The present invention is applied to a permanent electromagnetic holder configured to be capable of attracting an object to be attracted using a magnetic force, and a conveyance device including the permanent electromagnetic holder.

REFERENCE SIGNS LIST

1 Permanent electromagnetic holder
1_a_ Attracting surface
2 Object to be attracted
3 First magnet
4 Second magnet
5 Coil
6 Front yoke
6_a_ Groove
7 Back yoke
7_a_ Groove
8 Spacer
10 First magnet part
13 First magnet
14 Second magnet
15 First coil
16 Front yoke
17 First back yoke
18 Spacer
20 Second magnet part
23 Third magnet
24 Fourth magnet
25 Second coil
27 Second back yoke
28 Spacer
α Axial center

The invention claimed is:

1. A permanent electromagnetic holder including an attracting surface for an object to be attracted, configured to be capable of attracting the object to be attracted in an attraction ON state, and configured to be capable of detaching the object to be attracted that has been attracted in an attraction OFF state, the permanent electromagnetic holder comprising:

a first magnet that is a magnet having a relatively small coercive force;

a second magnet that is a rare-earth magnet having a relatively large coercive force and is configured in a ring shape; and a coil configured to magnetize the first magnet through energization of the coil, the first magnet being configured such that magnetic pole surfaces of different magnetic poles are oriented in a thrust direction of an axial center orthogonal to the attracting surface and passing through a center of the attracting surface, the second magnet being configured such that magnetic pole surfaces of different magnetic poles are oriented in the thrust direction of the axial center and being disposed outside the first magnet in a radial direction of the axial center, the coil being disposed between the first magnet and the second magnet, the first magnet, the second magnet, and the coil being arranged so as to overlap in the radial direction of the axial center, and an operation of switching an attraction ON/OFF state being carried out by switching a magnetizing direction of the first magnet through instantaneous energization of the coil when the attraction ON/OFF state is switched.

2. The permanent electromagnetic holder according to claim 1, wherein a length of the first magnet in the thrust direction of the axial center is shorter than a length of the first magnet in the radial direction of the axial center, and the second magnet is formed in an annular shape, and a length of the second magnet in the thrust direction of the axial center is shorter than a length of the second magnet in the radial direction of the axial center.

3. A conveyance device comprising the permanent electromagnetic holder according to claim 2.

4. The permanent electromagnetic holder according to claim 1, further comprising a back yoke in which a bottom part is disposed on a side opposite to an attracting surface side in the thrust direction of the axial center and an opening is disposed on the attracting surface side in the thrust direction of the axial center, wherein the first magnet, the second magnet, and the coil are disposed inside the back yoke, and the coil is wound around a part of the back yoke inside the back yoke and is disposed so as to bite into the back yoke.

5. A conveyance device comprising the permanent electromagnetic holder according to claim 4.

6. A conveyance device comprising the permanent electromagnetic holder according to claim 1.

* * * * *